Patented July 31, 1945

2,380,848

UNITED STATES PATENT OFFICE 2,380,848

PREPARATION OF MODIFIED STARCH PRODUCT

Ralph W. Kerr, Riverside, Ill., assignor to Corn Products Refining Company, New York, N. Y., a corporation of New Jersey No Drawing. Application October 19, 1942, Serial No. 462,589

7 Claims. (Cl. 195—17)

This invention relates to a modified starch for use in paper coating and other uses where high colloidal stability is desirable, and to the preparation of such a product.

One object of the invention is to provide a starch bonding agent for inclusion in clay paper coating compositions, which is comparable in its efficiency to casein.

Another object is to provide a starch product for use as a bonding or adhesive agent which is superior to starch products heretofore used for such purposes.

A further object is to provide an improved starch product efficient as a binding agent having high colloidal stability.

In clay coatings for paper, in which the present modified starch is useful, casein has commonly been used to bond the inert, finely divided filler material, such as clay or other argillaceous material, firmly to the paper. Various starch preparations have also been used but these have been substantially inferior to coatings employing casein. Clay coating compositions embodying the present modified starch, produce results comparable to those obtainable with casein.

Among the qualities which characterize an efficient clay paper coating composition is the ability of the binding agent to bond well the filler to the paper. This quality is measured by a so-called water retention test wherein samples of the paper to be coated are floated on the clay coating composition and the time required for the water in the clay coating composition to penetrate to the upper surface of the paper is noted. The longer the time required, the better the bonding power. Another standard test is the so-called wax test wherein a series of wax sticks, having various predetermined adhesive qualities are used. The end of each stick is melted or softened by heat and then pressed against the paper to be tested. When cool, the stick is lifted from the paper to determine whether it pulls away from the paper clean, or whether a portion of the surface adheres to the stick. Superior quality in the coating is indicated by ability to resist wax sticks of increasing adhesiveness. Appropriate viscosity and plasticity are other important characteristics of the coating composition.

For convenience the present modified starch has been called a modified residue starch, since it is prepared from the residue remaining after enzyme conversion of non-gelatinized starch milk. According to one process, the residue starch is prepared by treating a slurry of corn (maize) starch with a diastatic enzyme, such, for example, as the enzyme product known on the market as Pabst Exsize. Other enzymes capable of saccharification, such for example, as Vanzyme (Vanderbilt) may be used. The slurry, or starch milk, which may advantageously be a 22° Baumé suspension of second American filter raw starch, is preferably adjusted to a pH of about 5, that is, between 4.5 and 6.5, after which about 1%, that is, 0.5% to 5.0% of a diastatic enzyme, such as Pabst Exsize (based on dry starch weight) is added. The conversion continues about 24 hours, that is, between 18 to 30 hours, at a temperature between 120° and 135° F. While conversion may take place at still higher temperatures (below, however, the gelatinizing temperature of 150° F.), ease of conversion decreases at such high temperatures, and the colloidal properties of the product are adversely affected by temperatures above 135° F. The preferred temperature is 125° F. During conversion between 10 and 20% of the starch is solubilized. No more than about 20% of the starch should be thus solubilized if impairment of the quality of the residue starch (particularly as regards colloidal stability) is to be avoided. The product is then filtered, and the filter cake is re-suspended in fresh water and adjusted to a pH of about 7.0, that is, between 6.5 and 7.5, after which it is again filtered and dried. Any excess enzyme is removed in the washing.

The foregoing starch residue comprises between 80 and 90% of the original starch. It is a thick boiling starch showing little change in hot paste viscosity as compared with the original raw starch. The latter has a thick boiling 15 gram Scott viscosity of about 69 seconds for 50 c. c., and the residue starch a thick boiling Scott viscosity of about 65 seconds under the same conditions. The Scott test is a standard test and is described in my Patent U. S. No. 2,108,862.

To adapt the aforesaid residue starch for use in clay paper coating compositions and preparations wherein it serves a similar or comparable function, it is modified to a thin boiling character.

In an illustrative process, residue starch mixed with about four times its weight of water is treated with an enzyme containing a substantial proportion of a starch liquefying component, such as that commonly referred to as alpha-amylase. The amount of enzyme used will depend upon the kind, since commercial enzymes vary in their starch converting and liquefying power. For example, if the enzyme known on the market as Amyliq (Wallerstein) be used, about 0.85 pound per 100 pounds of dry residue starch is required. Another enzyme known as Vanzyme (Vanderbilt)

requires 0.4 pound per 100 pounds of dry starch; and Diastase A (Rohm and Haas) requires about 0.42 pound per 100 pounds dry starch substance.

The mixture prior to such enzyme treatment is adjusted to a pH of about 7.0 as by addition of borax, for example, to secure maximum water retention characteristic in the clay coating composition in which the modified residue starch is used. When conversion occurs at a pH above 7.0, water retention of the coating composition decreases. Apparently the pH is more critical for the starch paste than for the enzyme. Thus, while a pH of 6 to 6.5 is optimum for enzymes of the Vanzyme class, enzyme conversion at a pH of 7 results in maximum water retention in the coating composition.

Modification is allowed to proceed, preferably with agitation, for about 30 minutes at a temperature of about 164–170° F., the increase of temperature to this level being accomplished gradually throughout a period of about 20–23 minutes. If the enzyme Amyliq (Wallerstein) is used the preferred converting temperature is 170° F. If the enzyme Diastase A (Rohm and Haas) is used the preferred converting temperature is about 165° F. (i. e. within the range of about 164°–168° F.). Most of the conversion takes place in the first 10 minutes of converting time but it is preferred to use the longer period to insure more complete conversion.

Thereafter, the enzyme is "killed" by increasing the temperature to about 205° F. and maintaining it for about 15 to 30 minutes at such temperature in the case of Amyliq and in the case of Diastase A (Rohm and Haas). In the case of Vanzyme, however, the heating period should preferably not exceed 5 minutes at 205° F. Cooking longer than necessary results in reduction of water retention. The proper time should be determined for each enzyme.

The proper degree of conversion produces a paste having a 70 gram Scott test hot waste viscosity of about 30 to 35 seconds on a hundred cc. sample of paste. That is, 70 grams of starch and 280 cc. of water are heated as specified in my Patent No. 2,108,862, and the time of flow of 100 cc. of paste is measured in seconds.

The converted paste is then cooled to about 100–130° F. and should preferably be used promptly, since there is a tendency to retrogradation. In the case of clay paper coating, the starch paste is incorporated in a slurry of china clay or other appropriate clay or filler material. The china clay slurry comprises about ⅔ part of china clay and ⅓ part of water, with a small amount of clay dispersing agent, such as about 0.2% sodium pyrophosphate, based on the weight of the clay. The 20% starch paste is mixed with the clay slurry in the ratio of about 150 pounds of starch paste to 290 pounds of clay slurry. This mixture is further diluted with water, to give a composition containing about 35% to about 50% solids, and is blended, as in a high speed mixer, for about 15 minutes.

In the resultant coating composition the ratio of modified residue starch to clay is generally about 12–15 pounds of starch to 100 pounds of clay, dry weight, but this ratio may be varied as desired. One may increase the so-called wax test of the coating by increasing the ratio of starch to clay. As compared with other starch products heretofore used in clay coatings, considerably less modified residue starch is required to obtain a given wax test.

The coating composition may be used in the conventional manner in standard paper coating machines.

The principles of the invention are applicable not only to corn starch but to other cereal and root starches.

Obviously, the invention is not limited to the details of the illustrative product and the method of preparation thereof since these may be variously modified. By reason of its superior bonding or adhesive power and high colloidal stability various other uses of modified residue starch will be apparent to those skilled in the art. Moreover, it is not indispensable that all features of the invention be used conjointly, since various features may be used to advantage in different combinations and subcombinations.

While the foregoing description of the invention has referred particularly to modification of residue starch by enzymatic conversion, residue starch may be modified, for various purposes, by oxidizing agents, such as peroxides and chlorine, by acids, and by other known starch modifying agents.

As illustrative of the modification of residue starch by means other than enzymatic conversion, reference may be had to the following examples:

(a) One liter of a 22° Bé. water suspension of residue starch is treated at 125° F. with 1.5 grams of sodium peroxide at a pH of 8.5. This resulted in a starch which gave a 22.5 gram Scott viscosity of 161 seconds for 50 cc. of paste as determined at 7.4 pH.

(b) Using 1 gram of sodium peroxide under conditions otherwise as in (a) results in a modified residue starch having a higher hot paste viscosity, namely a 22.5 gram Scott viscosity of 240 seconds for 50 cc. of paste at 7.4 pH.

(c) One liter of a 22° Bé. water suspension of residue starch is treated at 125° F. with 3.5 grams of sodium peroxide and 20 cc. of 1:10 100 volume hydrogen peroxide. This resulted in a 100 gram Scott of 45 seconds for 50 cc. of paste at 7.4 pH.

In the appended claims, the expression "residue starch" is to be understood to mean and to refer to starch having a hot paste viscosity, as measured by the Scott test, which is not substantially different from that of raw starch, and which is produced from raw starch by elimination of solubles therefrom, as by means of enzyme conversion below the gelatinization point of the starch.

I claim:

1. The method of making a modified residue starch which comprises saccharifying about 10–20 per cent of the starch contained in a raw starch milk by means of a diastatic enzyme at a temperature below the gelatinization temperature of the starch, effecting separation as between the saccharified portion of the starch and the remainder thereof, and subjecting the latter to treatment at an elevated temperature with a starch liquefying agent to reduce the hot paste Scott viscosity characteristic thereof.

2. The method of making a starch product which comprises saccharifying about 10–20 per cent of the starch contained in a raw starch milk by means of a diastatic enzyme at a temperature below the gelatinization temperature of the starch, effecting separation as between the saccharified portion of the starch and the remainder thereof, and further modifying the latter by conversion with a starch liquefying enzyme.

3. The method of making a thin boiling residue corn starch which comprises saccharifying up to about 20 per cent of the starch contained in a raw starch milk by means of a diastatic enzyme at a temperature below 135° F., effecting separation as between the saccharified portion of the starch and the remainder thereof, and further modifying the latter by means of a starch liquefying enzyme at a temperature of about 164 to about 170° F., for about 10 to about 30 minutes.

4. The method of producing a modified residue starch which comprises enzymatically saccharifying a portion of the starch contained in a raw starch milk at a temperature below the gelatinization temperature of the starch, effecting separation as between the saccharified starch and the residue, and enzymatically liquefying the residue to a hot paste 70 gram Scott viscosity of about 30-35 seconds for 100 cc. of paste.

5. The method according to claim 4 in which the enzyme liquefaction of the residue starch is conducted at a pH of about 7.0.

6. The method according to claim 4 in which the enzyme liquefaction of the residue starch proceeds at a temperature between about 164° and about 170° F. for a period from about 10 to 30 minutes in the presence of about 0.4 to about 0.85% of enzyme based upon the weight of the residue starch dry substance.

7. A method according to claim 4 in which the enzyme liquefaction of the residue starch proceeds at a temperature of about 164° to about 170° F. for a period of about 10 to 30 minutes in the presence of about 0.4 to about 0.85% of enzyme based upon the weight of the residue starch dry substance, and in which the temperature is then increased to about 205° F. and maintained at such level for about 5 to about 30 minutes.

RALPH W. KERR.